(12) United States Patent
Meuter et al.

(10) Patent No.: US 12,188,780 B2
(45) Date of Patent: Jan. 7, 2025

(54) METHODS AND SYSTEM FOR DETERMINING A LOCATION OF AN OBJECT

(71) Applicant: Aptiv Technologies AG, Schaffhausen (CH)

(72) Inventors: Mirko Meuter, Erkrath (DE);
Christian Nunn, Hückeswagen (DE);
Weimeng Zhu, Wuppertal (DE);
Florian Kaestner, Bochum (DE);
Adrian Becker, Leverkusen (DE);
Markus Schoeler, Wuppertal (DE)

(73) Assignee: Aptiv Technologies AG, Schaffhausen (CH)

( * ) Notice: Subject to any disclaimer, the term of this patent is extended or adjusted under 35 U.S.C. 154(b) by 463 days.

(21) Appl. No.: 17/647,306

(22) Filed: Jan. 6, 2022

(65) Prior Publication Data
US 2022/0221303 A1      Jul. 14, 2022

(30) Foreign Application Priority Data

Jan. 11, 2021   (EP) ..................... 21150892

(51) Int. Cl.
*G01S 13/89*      (2006.01)
*G01C 21/00*      (2006.01)
(Continued)

(52) U.S. Cl.
CPC .......... *G01C 21/3837* (2020.08); *G01S 13/89* (2013.01); *G01S 19/41* (2013.01); *G06N 3/08* (2013.01); *G06T 7/30* (2017.01); *G06T 7/74* (2017.01); *G06T 2207/20081* (2013.01); *G06T 2207/20084* (2013.01)

(58) Field of Classification Search
CPC ......... G01C 21/3837; G06T 7/74; G06T 7/30; G06T 2207/20081; G06T 2207/20084; G01S 13/89; G01S 19/41; G06N 3/08
See application file for complete search history.

(56) References Cited

U.S. PATENT DOCUMENTS

| 6,404,608 B1 | 6/2002 | Pryor et al. |
| 2020/0098135 A1 | 3/2020 | Ganjineh et al. |
| 2020/0240790 A1 | 7/2020 | Behrendt et al. |

FOREIGN PATENT DOCUMENTS

| CN | 215817495 U | 2/2022 |
| EP | 2690784 A1 | 1/2014 |

(Continued)

OTHER PUBLICATIONS

"Extended European Search Report", EP Application No. 21150892. 4, Jul. 2, 2021, 10 pgaes.

(Continued)

*Primary Examiner* — Mathew Franklin Gordon
(74) *Attorney, Agent, or Firm* — Harness, Dickey & Pierce, P.L.C.

(57) ABSTRACT

A computer implemented method for determining a location of an object comprises the following steps carried out by computer hardware components: determining a pre-stored map of a vicinity of the object; acquiring sensor data related to the vicinity of the object; determining an actual map based on the acquired sensor data; carrying out image registration based on the pre-stored map and the actual map; carrying out image registration based on the image retrieval; and determining a location of the object based on the image registration.

20 Claims, 4 Drawing Sheets

(51) Int. Cl.
    *G01S 19/41*     (2010.01)
    *G06N 3/08*     (2023.01)
    *G06T 7/30*     (2017.01)
    *G06T 7/73*     (2017.01)

(56) References Cited

FOREIGN PATENT DOCUMENTS

| JP | 2012157088 A | 8/2012 |
| JP | 2017153171 A | 8/2017 |

OTHER PUBLICATIONS

Gordo, et al., "Deep Image Retrieval: Learning global representations for image search", Jul. 28, 2016, 21 pages.
King, et al., "Sonar Image Registration for Localization of an Underwater Vehicle", Oct. 2017, 23 pages.
Nguyen, et al., "Unsupervised Deep Homography: A Fast and Robust Homography Estimation Model", Feb. 21, 2018, 8 pages.
First Office Action regarding Chinese Patent Application No. 202111127758.8, dated Oct. 31, 2024. Translation provided by Google Translate.

METHODS AND SYSTEM FOR DETERMINING A LOCATION OF AN OBJECT

CROSS-REFERENCE TO RELATED APPLICATION

This application claims priority to European Patent Application Number 21150892.4, filed Jan. 11, 2021, the disclosure of which is hereby incorporated by reference in its entirety herein.

BACKGROUND

Localization and mapping is an important base for robot navigation and is also a needed building block for autonomous vehicles. However, localization and mapping may be computationally expensive and/or inaccurate.

Accordingly, there is a need to provide enhanced localization and mapping.

SUMMARY

The present disclosure relates to methods and system for determining a location of an object. For example, the present disclosure provides a computer implemented method, a computer system, a vehicle, and a non-transitory computer readable medium according to the claims, the description, and the drawings.

In one aspect, the present disclosure is directed at a computer implemented method for determining a location of an object (for example a vehicle), the method comprising the following steps performed (in other words: carried out) by computer hardware components: determining a pre-stored map of a vicinity of the object; acquiring sensor data related to the vicinity of the object; determining an actual map based on the acquired sensor data; carrying out image retrieval based on the pre-stored map and the actual map; carrying out image registration based on the image retrieval; and determining a location of the object based on the image registration.

According to another aspect, the sensor data comprises radar sensor data. According to another aspect, the sensor data comprises Global Positioning System sensor data.

According to another aspect, the pre-stored map is generated based on a plurality of sub-maps. The plurality of sub-maps may then be put (or stitched) together to obtain the pre-stored map. The plurality of sub-maps may overlap, so that the correct position for each sub-map in the pre-stored map may be determined.

According to another aspect, the pre-stored map is generated using an artificial neural network, for example a recurrent neural network.

According to another aspect, the pre-stored map is trained in a machine learning method together (in other words: simultaneously, in other words: concurrently) with training of at least one of determining the actual map, carrying out the image registration, and determining the location of the object.

According to another aspect, the pre-stored map is generated using a Differential Global Positioning (DGPS) System, which is an example of a Global Positioning System (GPS).

It has been found that taking maps from different points in time using DGPS create a large amount of matching data without the need to annotate manually. The matching data may be used to train the image retrieval and/or image registration. The large amount of matching data may provide large scale position databases, wherein maps and (D)GPS positions may be combined, and each map may be generated all n seconds and stored together with GPS point and direction. All data may be collected and organize in a grid. The (D)GPS may provide a 2D representation of the environment as perceived by the vehicle.

The 2D map creating may include to "convolve" with a kernel over each grid cell taking neighboring cells into account, and to sample pairs within the kernel. Translations and rotations between each pair within the kernel may be estimated if possible. For each successful paring, a mean (D)GPS position minimizing the following three expressions may be estimated:

$$w_1(G_{est_i} - G_{meas_i})^2$$
$$w_1(G_{est_j} - G_{meas_j})^2$$
$$w_2(R_{ij}G_{est_i} - G_{est_j} + t_{ij})^2$$

The first and the second expression indicate a difference between estimated position (in x and y coordinates, i.e. $G_{est_i}$ and $G_{est_j}$) and measured (D)GPS position (in x and y coordinates, i.e. $G_{meas_i}$ and $G_{meas_j}$). This may provide a global anchoring.

The third expression may indicate an estimated translation and rotation between two patches, which may correct the estimated (D)GPS position. This may provide a matching problem.

Then, a weighted addition of all points in the kernel may be carried out, and the result may be applied to the grid cell where the kernel is centered upon.

According to various embodiments, generalization of the map creation may be provided. For example, maps being created may also be features from neural networks, so that feature maps may be generated. This may allow to find low level features for the problem at hand.

According to another aspect, the pre-stored map is generated using a radar sensor.

According to another aspect, the image registration comprises matching the pre-stored map and the actual map.

It is to be understood that image retrieval refers to determining a set of images which contain the current scene. It is to be understood that image registration refers to determining the transformation which is needed to match the current image to the retrieved image.

It is to be understood that although no actual (visual, camera-acquired) images are employed into the image registration, methods for image registration which are widely available may be used to match the pre-stored map and the actual map (for example to determine a translation and a rotation that brings the pre-stored map and the actual map into alignment). The map may be treated as an image, for example it may use an image-like data structure. Image like data structure may be represented as an array-like data structure with each element encoding an n-dimensional cell feature.

According to another aspect, the image registration comprises determining a translation and/or a rotation so that the actual map matches the pre-stored map; and the location of the object is determined based on the translation and/or the rotation.

According to various aspects, vehicle localization and mapping may be provided in which the mapping is performed both on occupancy grid information developed from at least DGPS data using deep learning and on occupancy grid information developed directly from GPS data, and these are classified together to provide localization.

In another aspect, the present disclosure is directed at a computer system, said computer system comprising a plurality of computer hardware components configured to carry out several or all steps of the computer implemented method described herein.

The computer system may comprise a plurality of computer hardware components (for example a processor, for example processing unit or processing network, at least one memory, for example memory unit or memory network, and at least one non-transitory data storage). It is to be understood that further computer hardware components may be provided and used for carrying out steps of the computer implemented method in the computer system. The non-transitory data storage and/or the memory unit may comprise a computer program for instructing the computer to perform several or all steps or aspects of the computer implemented method described herein, for example using the processing unit and the at least one memory unit.

In another aspect, the present disclosure is directed at a vehicle comprising the computer system described herein.

According to another aspect, the computer system and/or the vehicle further comprises the sensor.

According to another aspect, the computer system and/or the vehicle further comprises a map storage configured to store the pre-stored map of the vicinity of the object.

In another aspect, the present disclosure is directed at a non-transitory computer readable medium comprising instructions for carrying out several or all steps or aspects of the computer implemented method described herein. The computer readable medium may be configured as: an optical medium, such as a compact disc (CD) or a digital versatile disk (DVD); a magnetic medium, such as a hard disk drive (HDD); a solid state drive (SSD); a read only memory (ROM), such as a flash memory; or the like. Furthermore, the computer readable medium may be configured as a data storage that is accessible via a data connection, such as an internet connection. The computer readable medium may, for example, be an online data repository or a cloud storage.

The present disclosure is also directed at a computer program for instructing a computer to perform several or all steps or aspects of the computer implemented method described herein.

BRIEF DESCRIPTION OF THE DRAWINGS

Exemplary embodiments and functions of the present disclosure are described herein in conjunction with the following drawings, showing schematically.

DETAILED DESCRIPTION

Localization and mapping may be an important base for robot navigation and is also a needed building block for autonomous vehicles. A working localization may not only be a base for lane accurate positioning and navigation, but it may also add redundancy using a map as additional safety input.

While machine learning has shown advantages in many areas, for localization and mapping classical matching and tracking approaches are still broadly used in literature.

According to various embodiments, a new chain for localization and mapping may be provided, which employs machine learning. It has been found that the method and chain according to various embodiments gives a closed form answer at least to the following questions:

Is the problem solvable at the current location (presence of ambiguities)?
What is the solution?
What features are needed to provide a solution?
How can features be compressed to provide the data needed to solve the problem?
How to create a map using multiple locally matched maps?

According to various embodiments, the localization and (at least partially) also the map building problem may be cast into an image registration problem. The objective for image registration may be to find a transformation matrix (e.g. affine, perspective), which best maps an image like data cube onto another image-like data cube (e.g. mapping two recorded maps of the same scene from different times with slight changes in the environment). For radar, a number of methods may be used to depict the environment in a map-like representation (for example as occupancy grid maps). Assuming an accurate picture or map of the environment generated from one set of sensors combined with a sensor for accurate positioning, e.g. DGPS (Differential Global Positioning System), a base input for re-localization may be provided.

Given a map with this data and an occupancy grid from an actual sensor recording may reduce the problem to find the right translation and rotation between the ground truth map and the actual sensor map. Thus, the localization problem may be a matching problem of these two images. A number of methods may be used to detect whether two images have the same content (which may be an image retrieval problem) and to register and match images towards each other and identifying the transformation to do so. Thus, for the basic problem to estimate rotations and translations, various machine learning methods, which are commonly available, may be used.

Figure 1:
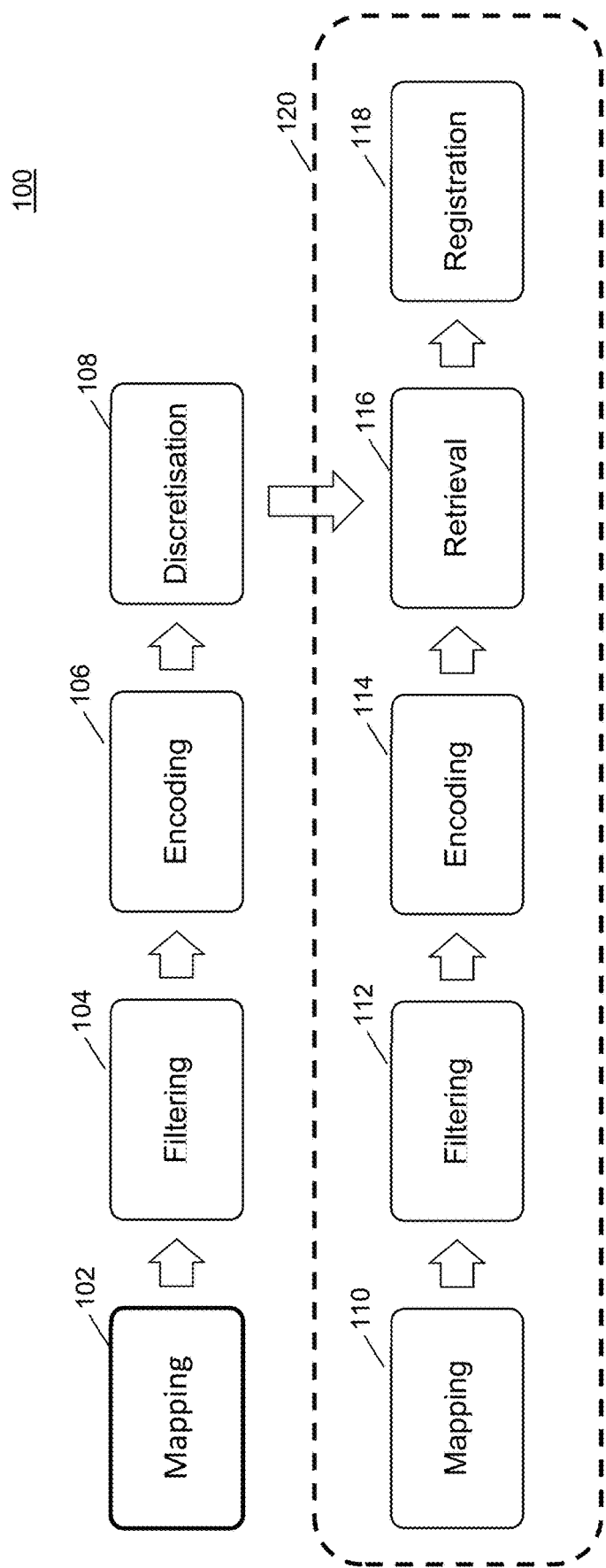
FIG. 1 an illustration of how to create a reference map and localize against this map according to various embodiments.

FIG. 1 shows an illustration 100 of how to create a reference map and localize against this map according to various embodiments. The blocks for processing as illustrated in FIG. 1 may be referred to as end to end network (or end to end chain).

Map creation may include mapping 102, filtering 104, encoding 106, and discretization 108. The reference data, based on which the pre-stored may is generated, may be acquired using a vehicle with DGPS data.

For mapping 102, the DGPS vehicle may either have an occupancy grid environment generation module or use a deep learning module to generate an occupancy grid (which may allow generating deeper features).

For filtering 104, these maps may be filtered to remove parking cars and temporal objects. For this filtering, classical object detection methods may be used. Taking road images from different timesteps may also allow deep networks to create a filter automatically.

For encoding 106, an encoder network may provide a compressed abstract representation of the input and may thus provide a semantically rich occupancy grid. Learning the encoding end to end may ensure that the compression takes the problem at hand into consideration. Using machine learning for encoding may allow to train the encoding end to end so that no information necessary for the task is lost. Encoding may allow an enhanced data compression.

For discretization 108, the occupancy grid may be partitioned into a (DGPS) grid where each cell does not only contain the map for this cell, but also the surrounding environment. This method may avoid problems if the actual location is close to the boundary of the cell. This representation may artificially be created by not only loading the cell but also neighboring cells. Each environmental map may be mapped to a GPS cell and stored in the database where the database is organized for GPS positions.

Localization (as indicated by dashed box 120) may include mapping 110, filtering 112, encoding 114, retrieval 116, and registration 118.

For mapping 110, it may be assumed that an actual scene from the surrounding sensors using again an occupancy grid map is available. This scene may be recorded with normal GPS information. The GPS may allow identifying the rough location in the database (in other words: in the pre-stored map), namely the matching cell and neighboring cells which may contain the actual location of the vehicle as well due to GPS inaccuracies (which is the reason why localization may actually be desired).

For filtering 112, that scene may be filtered again, for example similar or identical to filtering 104 as described above.

For encoding 114, the scene may be encoded using an encoder network, for example similar or identical to encoding 106 as described above.

Based on the map creation and the scene detection, an encoded scene in each cell in the database (in other words: in the pre-stored map) and an encoded scene of the vehicle neighborhood (in other words: an actual map) may be provided. Based on the pre-stored map and the actual map, registration 118 may be carried out based on (image) retrieval 116.

For (image) retrieval 116, the vehicle neighborhood may be matched to a cell in the database (in other words: in the pre-stored map), which may be based on classical (or commonly used) image retrieval. This may be either casted into a generation of matching scores or into a binary classification problem. The binary classification may also identify if there is more than one cell in the neighborhood, which has similar contents, thus revealing the uniqueness of the scene.

For registration 118, in each cell, the actual translation and rotation towards the cell center may be identified. This may be done with a matching method for regressing translation and rotation of each cell.

Discretization 108 and retrieval 116 may provide for retrieving GPS environmental data from the map and encoding the environment into a grid. Each cell may contain all encoded neighborhood. The cells containing the neighboring map may be stored.

As described above, localization may be considered as an image retrieval problem. For example, with respect to a map including several blocks (or cells), for one or more blocks a score may be determined indicating in which block the object to be localized is located. The network may be forced to give the cell where the object is located the lowest score. This may force the network to learn features for a unique localization. According to various embodiments, a deep network architecture for retrieval, which are widely available, may be employed.

Situations may occur where image retrieval may match the perceived scene to multiple locations in a database. This may for example occur when a car is on a straight highway where the measurements are very similar for various positions along the straight highway. According to various embodiments, a confidence map may be provided. The confidence may indicate the existence of such ambiguous solutions.

Localization may be considered as a regression or spatial alignment problem. For the winning cell, the network may regress offset and angle, or a spatial transformer network may be used to align the stored map and the actual map in such a way, that the difference is minimized. Learning an image retrieval problem in parallel may avoid learning the trivial solution, namely setting everything to zero.

According to various embodiments, the localization method may be trained in the chain as illustrated in FIG. 1. It has been found that thus, the network may automatically encode the right features to solve the image retrieval problem and matching problem. Furthermore, the network may provide increased robustness compared to commonly used localization methods. The image retrieval head of the network may identify if there exists a unique solution in the data.

According to various embodiments, the pre-stored map may be generated from multiple scans together with GPS positions. Thus, a highly accurate map may be generated by stitching multiple map snippets, e.g. occupancy grid maps generated by radars together with GPS position together, where each snippet has a GPS position. A matching method, or a matching network calculating the translation and rotation between each map, may be used, given there is an overlap. The matching method may thus identify whether there is an overlap and a correct matching, and/or the translation and rotation between one patch and the other patch. Given this data, the GPS positions and directions may be estimated in such a way that the difference between estimated GPS positions and directions to the measured positions and directions is minimized, and/or that the estimated GPS positions and rotations from one patch rotated and translated according to the matching may yield the second GPS position and direction estimate. Each matching pair in a certain environment may yield at least three equations, which may for example be tuned for a large environment using a least squares minimization where each equation is weighted according to its expected accuracy.

According to various embodiments, the pre-stored may be generated using a recurrent (neural) network (RNN). A network connecting raw data over multiple timeframes may be provided, for example using a Cartesian transformation for sensor connections and an ego motion compensation spatial transformation of the memory elements. Such a network structure may allow using raw features for the identification of scenes.

According to various embodiments, an environmental representation (for example including pre-processed or unprocessed radar data of an environment of a vehicle as well as (D)GPS locations) may be created and stored on the cloud in a database. Information from the database may be retrieved using measured GPS information. Then, localization may be carried out.

According to various embodiments, redundancy may be created by fusing local data with data from the cloud. This may provide an accurate localization, may provide knowledge where others have driven, and may fuse sensor information from previous drives.

Figure 2:
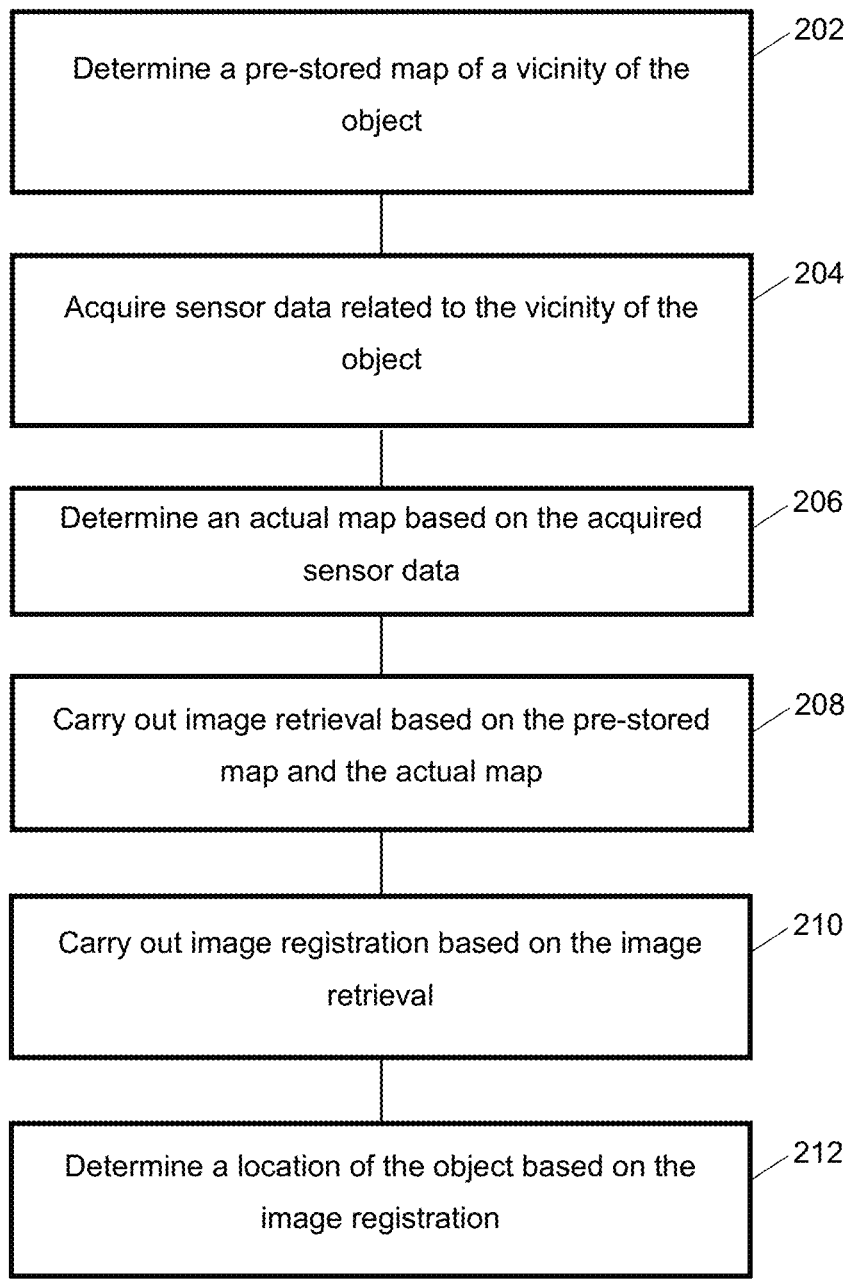
FIG. 2 a flow diagram illustrating a method for determining a location of an object according to various embodiments.

FIG. 2 shows a flow diagram 200 illustrating a method for determining a location of an object according to various embodiments. At 202, a pre-stored map of a vicinity of the object may be determined. At 204, sensor data (for example radar and/or camera data) related to the vicinity of the object may be acquired. At 206, an actual map may be determined based on the acquired sensor data (using for example the feature of a neural network). At 208, image retrieval may be carried out based on (in other words: between) the pre-stored map and the actual map. At 210, image registration may be carried out based on the image retrieval. At 212, a location of the object may be determined based on the image registration.

According to various embodiments, the sensor data may include or may be radar sensor data.

According to various embodiments, the sensor data may include or may be Global Positioning System sensor data.

According to various embodiments, the pre-stored map may be generated based on a plurality of sub-maps.

According to various embodiments, the pre-stored map may be generated using a recurrent neural network.

According to various embodiments, the pre-stored map may be trained in a machine learning method together (in other words: simultaneously) with training of at least one of determining the actual map, carrying out the image registration, and determining the location of the object.

According to various embodiments, the pre-stored map may be generated using a Differential Global Positioning System (DGPS).

According to various embodiments, the pre-stored map may be generated using a radar sensor.

According to various embodiments, the image registration may include or may be matching the pre-stored map and the actual map.

According to various embodiments, the image registration may include or may be determining a translation and/or a rotation so that the actual map matches the pre-stored map; and the location of the object may be determined based on the translation and/or the rotation.

Each of the steps 202, 204, 206, 208, 210, 212 and the further steps described above may be performed by computer hardware components.

Figure 3:
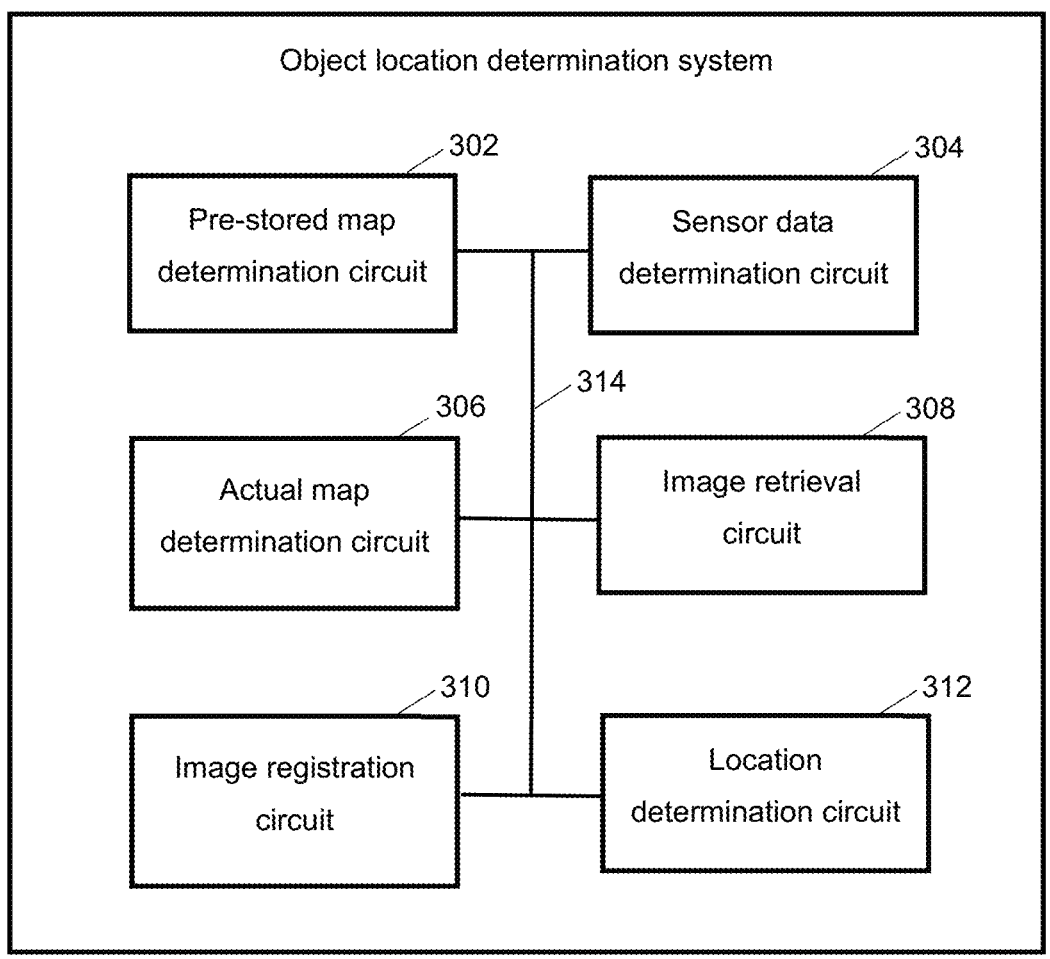
FIG. 3 an object location determination system according to various embodiments.

FIG. 3 shows an object location determination system 300 according to various embodiments. The object location determination system 300 may include a pre-stored map determination circuit 302, a sensor data determination circuit 304, an actual map determination circuit 306, an image retrieval circuit 308, an image registration circuit 310, and a location determination circuit 312.

The pre-stored map determination circuit 302 may be configured to determine a pre-stored map of a vicinity of the object.

The sensor data determination circuit 304 may be configured to acquire sensor data related to the vicinity of the object.

The actual map determination circuit 306 may be configured to determine an actual map based on the acquired sensor data.

The image retrieval circuit 308 may be configured to carry out image retrieval based on the pre-stored map and the actual map.

The image registration circuit 310 may be configured to carry out image registration based on the image retrieval.

The location determination circuit 312 may be configured to determine a location of the object based on the image registration.

The pre-stored map determination circuit 302, the sensor data determination circuit 304, the actual map determination circuit 306, the image retrieval circuit 308, the image registration circuit 310, and the location determination circuit 312 may be coupled with each other, e.g. via an electrical connection 3148, such as e.g. a cable or a computer bus or via any other suitable electrical connection to exchange electrical signals.

A "circuit" may be understood as any kind of a logic implementing entity, which may be special purpose circuitry or a processor executing a program stored in a memory, firmware, or any combination thereof.

Figure 4:
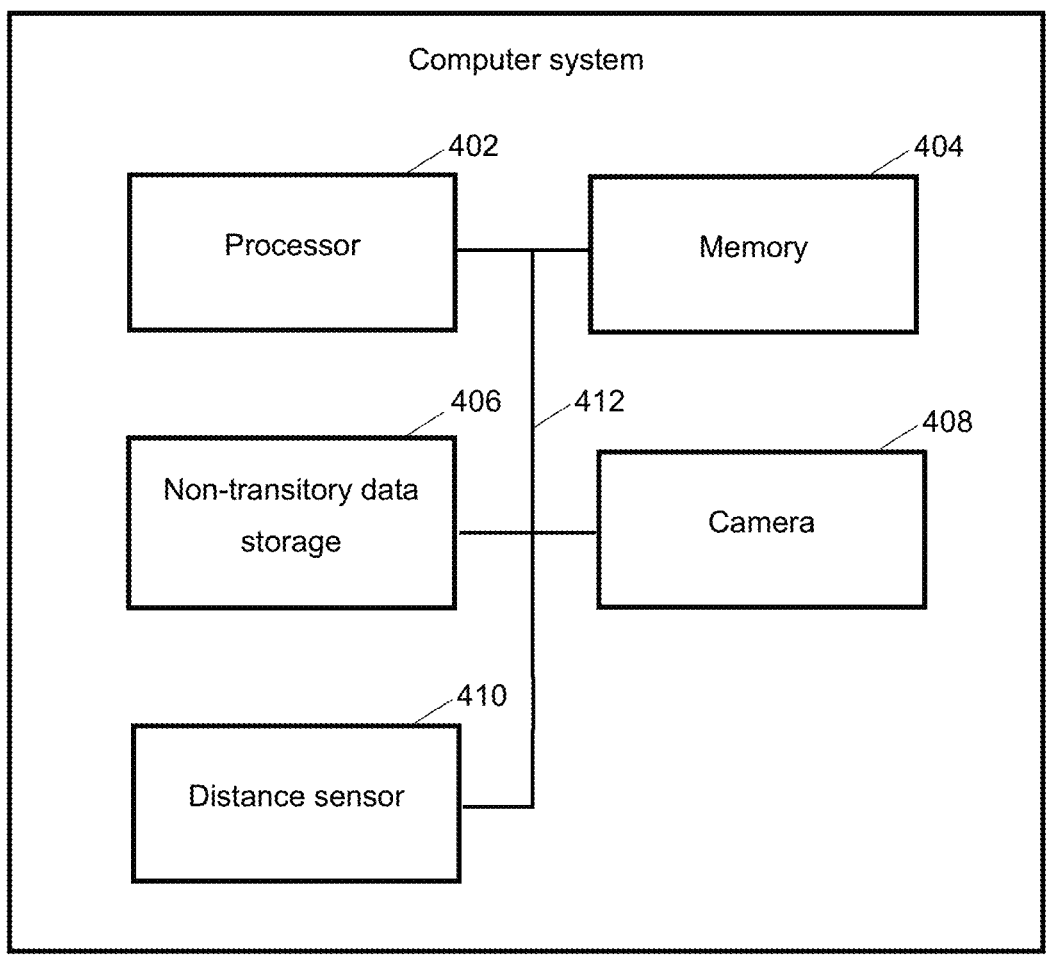
FIG. 4 a computer system with a plurality of computer hardware components configured to carry out steps of a computer implemented method for determining a location of an object according to various embodiments.

FIG. 4 shows a computer system 400 with a plurality of computer hardware components configured to carry out steps of a computer implemented method for determining a location of an object according to various embodiments. The computer system 400 may include a processor 402, a memory 404, and a non-transitory data storage 406. A camera 408 and/or a distance sensor 410 (for example a radar sensor and/or a lidar sensor) may be provided as part of the computer system 400 (like illustrated in FIG. 4), or may be provided external to the computer system 400.

The processor 402 may carry out instructions provided in the memory 404. The non-transitory data storage 406 may store a computer program, including the instructions that may be transferred to the memory 404 and then executed by the processor 402. The camera 408 and/or the distance sensor 410 may be used to acquire sensor data related to the vicinity of the object.

The processor 402, the memory 404, and the non-transitory data storage 406 may be coupled with each other, e.g. via an electrical connection 412, such as e.g. a cable or a computer bus or via any other suitable electrical connection to exchange electrical signals. The camera 408 and/or the distance sensor 410 may be coupled to the computer system 400, for example via an external interface, or may be provided as parts of the computer system (in other words: internal to the computer system, for example coupled via the electrical connection 412).

The terms "coupling" or "connection" are intended to include a direct "coupling" (for example via a physical link) or direct "connection" as well as an indirect "coupling" or indirect "connection" (for example via a logical link), respectively.

It is to be understood that what has been described for one of the methods above may analogously hold true for the object location determination system 300 and/or for the computer system 400.

What is claimed is:

1. A method comprising:
   determining, by computer hardware components, a location of an object by at least:
   determining a pre-stored map of a vicinity of the object;
   acquiring sensor data related to the vicinity of the object;
   determining an actual map based on the acquired sensor data;
   carrying out image retrieval based on the pre-stored map and the actual map;
   carrying out image registration based on the image retrieval; and
   determining the location of the object based on the image registration.

2. The method of claim 1,
wherein the sensor data comprises radar sensor data.

3. The method of claim 1,
wherein the sensor data comprises Global Positioning System sensor data.

4. The method of claim 1,
wherein the pre-stored map is generated based on a plurality of sub-maps.

5. The method of claim 1,
wherein the pre-stored map is generated using a recurrent neural network.

6. The method of claim 1,
wherein the pre-stored map is trained in a machine learning method together with training of at least one of determining the actual map, carrying out the image registration, and determining the location of the object.

7. The method of claim 1,
wherein the pre-stored map is generated using a Differential Global Positioning System.

8. The method of claim 1,
wherein the pre-stored map is generated using a radar sensor.

9. The method of claim 1,
wherein the image registration comprises matching the pre-stored map and the actual map.

10. The method of claim 1,
wherein the image registration comprises determining a translation and/or a rotation so that the actual map matches the pre-stored map; and
wherein the location of the object is determined based on the translation and/or the rotation.

11. A system comprising:
computer hardware components configured to determine a location of an object by at least:
determining a pre-stored map of a vicinity of the object;
acquiring sensor data related to the vicinity of the object;
determining an actual map based on the acquired sensor data;
carrying out image retrieval based on the pre-stored map and the actual map;
carrying out image registration based on the image retrieval; and
determining the location of the object based on the image registration.

12. The system of claim 11, further comprising a vehicle, wherein the computer hardware components are part of the vehicle.

13. The system of claim 11, wherein the computer hardware components are configured to acquire the sensor data from a sensor of a vehicle.

14. The system of claim 11, wherein the computer hardware components are configured to retrieve the pre-stored map of the vicinity of the object from a map storage that is part of a vehicle.

15. The system of claim 11, wherein the computer hardware components are further configured to:
generate, based on a plurality of sub-maps, the pre-stored map.

16. The system of claim 11, wherein the computer hardware components are further configured to:
generate, using a recurrent neural network, the pre-stored map.

17. The system of claim 11, wherein the computer hardware components are further configured to:
generate, using a recurrent neural network and based on a plurality of sub-maps, the pre-stored map.

18. The system of claim 11, wherein the computer hardware components are further configured to:
generate, using a radar sensor, the pre-stored map.

19. The system of claim 11, wherein the computer hardware components are further configured to:
generate, using a Differential Global Positioning System, the pre-stored map.

20. A non-transitory computer readable medium comprising executable instructions for configuring computer hardware components to determine a location of an object by at least:
determining a pre-stored map of a vicinity of the object;
acquiring sensor data related to the vicinity of the object;
determining an actual map based on the acquired sensor data;
carrying out image retrieval based on the pre-stored map and the actual map;
carrying out image registration based on the image retrieval; and
determining the location of the object based on the image registration.

* * * * *